US012423282B1

(12) United States Patent
Medikurthi et al.

(10) Patent No.: US 12,423,282 B1
(45) Date of Patent: Sep. 23, 2025

(54) OBJECT REFERENCE STRUCTURE GENERATION FOR DATA PURGING

(71) Applicant: SAP SE, Walldorf (DE)

(72) Inventors: Sreehari Medikurthi, Bangalore (IN); Pravin Kumar, Bangalore (IN); Tharanath Ramakrishna, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/792,265

(22) Filed: Aug. 1, 2024

(51) Int. Cl.
| G06F 16/20 | (2019.01) |
| G06F 16/215 | (2019.01) |
| G06F 16/2455 | (2019.01) |
| G06F 16/901 | (2019.01) |

(52) U.S. Cl.
CPC ...... *G06F 16/215* (2019.01); *G06F 16/24566* (2019.01); *G06F 16/9024* (2019.01); *G06F 16/9027* (2019.01)

(58) Field of Classification Search
CPC ............. G06F 16/215; G06F 16/24566; G06F 16/9024; G06F 16/9027
See application file for complete search history.

(56) References Cited

U.S. PATENT DOCUMENTS

| 10,572,448 | B1 | 2/2020 | Donohue et al. |
| 10,783,125 | B2 | 9/2020 | Bester et al. |
| 11,580,067 | B1 | 2/2023 | Kuruvada et al. |
| 2009/0106298 | A1* | 4/2009 | Furusho ................. G06F 16/81 707/999.102 |
| 2014/0101133 | A1* | 4/2014 | Carston ............ G06F 16/24542 707/718 |
| 2014/0351201 | A1 | 11/2014 | Hobart et al. |
| 2018/0081916 | A1 | 3/2018 | Jaiswal et al. |
| 2020/0073971 | A1* | 3/2020 | Elliott ................... H04L 43/045 |
| 2020/0242090 | A1 | 7/2020 | Prasad et al. |
| 2020/0265305 | A1 | 8/2020 | Budden et al. |
| 2021/0049510 | A1 | 2/2021 | Adjaoute |
| 2021/0089910 | A1 | 3/2021 | Zheng et al. |

(Continued)

OTHER PUBLICATIONS

"U.S. Appl. No. 18/502,305, Non Final Office Action mailed Jan. 3, 2025", 24 pgs.

(Continued)

*Primary Examiner* — Diedra McQuitery
(74) *Attorney, Agent, or Firm* — SCHWEGMAN LUNDBERG & WOESSNER, P.A.

(57) ABSTRACT

Systems and methods described herein relate to the automated generation of object reference structures for data purging processes. A primary query is executed in a database to identify first data objects with reference relationships to a root data object. Secondary queries are executed in the database to identify additional data objects with reference relationships to the first data objects or to other additional data objects identified in a previous one of the secondary queries. An object reference structure is generated based on the reference relationships among the root data object, the first data objects, and the additional data objects. The graphical representation is presented via a user interface. A purge instruction can be received with respect to at least part of the object reference structure. Execution of a data purge is triggered to purge data from the database according to the purge instruction.

20 Claims, 8 Drawing Sheets

(56) References Cited

U.S. PATENT DOCUMENTS

2021/0201147 A1 7/2021 Tu et al.
2024/0045847 A1* 2/2024 Wei ..................... G06F 16/2246

OTHER PUBLICATIONS

"U.S. Appl. No. 18/502,305, Examiner Interview Summary mailed Mar. 17, 2025", 3 pgs.
"U.S. Appl. No. 18/502,305, Response filed Mar. 31, 2025 to Non Final Office Action mailed Jan. 3, 2025", 16 pgs.
"Feedforward neural network", [Online]. Retrieved from the Internet: URL: https: web.archive.org web 20230711034608 https: en.wikipedia.org wiki Feedforward_neural_network, (accessed on Jul. 11, 2023), 7 pgs.

* cited by examiner

US 12,423,282 B1

OBJECT REFERENCE STRUCTURE GENERATION FOR DATA PURGING

TECHNICAL FIELD

The subject matter disclosed herein relates, generally, to database technology. More specifically, but not exclusively, the subject matter relates to the generation of object reference structures for data objects to facilitate, for example, the purging of data from a database.

BACKGROUND

Data purging is an important task in many computing environments. Data purging operations can free up storage space, improve system speeds, reduce costs, better protect sensitive information, or ensure compliance with data regulations, such as the European Union's General Data Protection Regulation (GDPR) or similar regulations in other territories. Data purging systems are often utilized in cloud-based environments with large databases to perform various data purging jobs, each according to a particular purge scope.

In many cases, the purge scope is defined by one or more user-provided criteria. For example, a user might request that all data related to a particular customer code be purged from a database. The identification of all data objects that are relevant to such a request can present technical challenges, particularly in large or complex databases. If the relevant data objects are not correctly or exhaustively identified, the subsequent purging process can result in errors or inconsistencies in the database, such as orphaned data records, and can hinder efforts to free up storage space.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
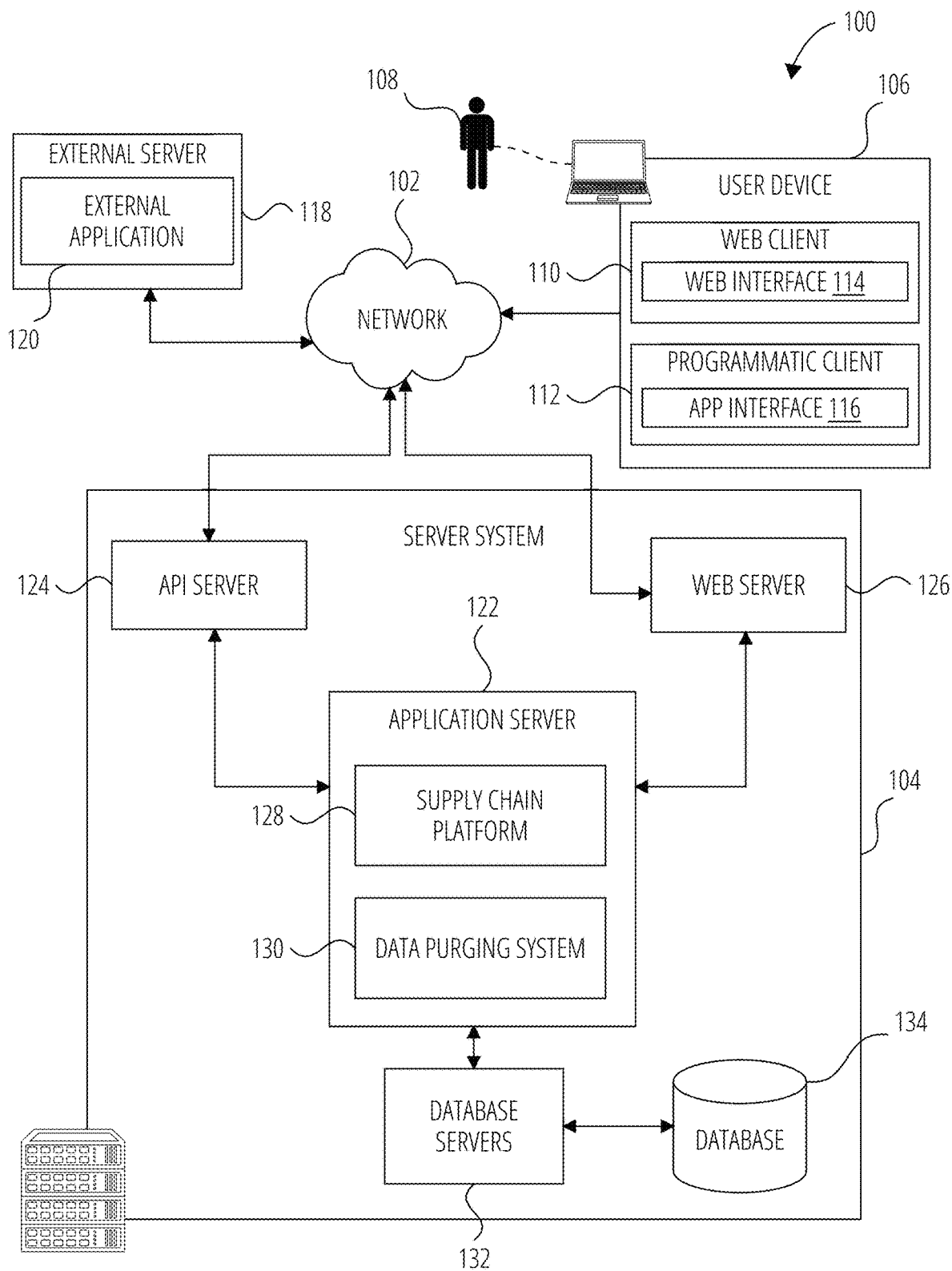
FIG. 1 diagrammatically illustrates a network environment that includes a data purging system, according to some examples.

A "data object," as used herein, refers to a logical or structural representation of an entity or concept. A data object may correspond to a real-world business object or entity. In some examples, in the context of a database, a data object is associated with specific data and can be mapped to a database table (or, in some cases, multiple tables). In some examples, a data object is represented by a main table for the data object in which each row of the main table represents an instance of the data object. Data objects can represent master data, such as base information used across multiple processes or transactions, or transaction data that relates to specific transactions.

Data objects can have relationships or dependencies. For example, a "Company_Code" data object can be represented by a table with "Company_Code" as its primary key, while "Company_Code" is also present in other tables as a property or attribute (e.g., a column or foreign key), forming a hierarchical or networked structure. Data objects can also be nested. For example, in some implementations, an "Address" data object is a nested property of "Company_Code," while in other implementations an "Address" data object is a separate data object with a foreign key reference to "Company_Code." A "reference relationship," as used herein, may include various types of such relationships or associations, including a data object dependency, such as one data object (e.g., a child data object) having another data object (e.g., a parent data object) as a property, or a nested object relationship.

It is, in many cases, important for entities to manage constantly increasing data volumes through data purging. The term "data purging" (or simply "purging"), as used herein, generally refers to a process of deleting or removing data from a system or device. A data purge may be a soft purge or a hard purge (or a combination thereof). The term "soft purge," as used herein, refers to purging one or more data items in a reversible manner or in a manner that otherwise allows for recovery of the purged data. For example, a soft purge might involve marking a record in a table as "deleted," or transferring a file to a recycle bin from where it can be recovered. The term "hard purge," as used herein, refers to purging one or more data items in a permanent or irreversible manner. For example, a hard purge might involve removing a data item from all systems or devices, including backup systems or devices, in such a manner that the data item is not recoverable after the purging process (e.g., the hard purge cannot subsequently be reversed).

When purging data from a database that is implemented with hierarchical or other data object dependencies, it is often necessary to identify the scope of data objects covered by a purge (or a potential purge). The correct and exhaustive identification of data objects can prevent technical issues, such as child records remaining in data systems in an "orphaned" state, or confusing outputs that reference records or identifiers that no longer exist (or only exist in partial form).

Examples described herein address technical challenges associated with the efficient and accurate identification of data objects, particularly (but not exclusively) in large-scale enterprise environments. In some examples, reference relationships are automatically detected and mapped via an object reference structure, facilitating downstream activities such as the purging of data associated with such data objects (e.g., based on criteria relating to the data objects). In relational database implementations, a user can be provided with an efficient and useful view of tables from which data will be purged, facilitating decision-making with respect to downstream activities.

In some examples, a method includes receiving, via a user interface, user input identifying a root data object. In response to receiving the user input, a system executes a primary query to identify first data objects with reference relationships to the root data object. Furthermore, secondary queries are executed to identify additional data objects with reference relationships to one or more of the first data objects or to any other additional data object identified in a previous one of the secondary queries until a predetermined condition is met.

The method may further include generating an object reference structure based on the reference relationships among the root data object, the first data objects, and the additional data objects. In some examples, the root data object is a primary or base data object from which the object reference structure is derived or initiated. For example, the root data object serves as a starting point for a set of queries that identify further data objects to be added to the object reference structure. In the context of data purging or data management, a root data object may be specified by a user to define the scope of data to be analyzed or processed.

For instance, if a user wishes to purge all data related to a specific customer, a "Customer_ID" data object is used as the root data object. As another example, if a user wishes to purge all data related to a specific tax code, a "Tax_ID" data object is used as the root data object.

An "object reference structure," as used herein, defines, represents, or illustrates reference relationships between associated, dependent, or interconnected data objects. Relationships can be explicit, such as a foreign key in a relational database linking two tables, or implicit, such as in the case of nested data objects. For example, a reference relationship might exist between a "Customer" data object and a "Purchase_Order" data object, where each purchase order explicitly references its associated customer through an identifier of the customer. In some examples, the database comprises a relational database, and each data object from among the root data object, the first data objects, and the additional data objects is mapped to a table in the database.

The method may include causing presentation, via the user interface, of a graphical representation of the object reference structure. For example, the object reference structure is visualized as a graph or tree where nodes represent data objects, and edges represent the reference relationships between the data objects. In this way, the object reference structure is provided as a visual tool for performing operations that benefit from knowledge of data object interdependencies or relationships, such as data purging or integrity checks.

Accordingly, in some examples, the graphical representation represents the object reference structure as a diagram (e.g., a tree diagram) that comprises a plurality of interconnected nodes, and each of the plurality of interconnected nodes represents a respective one of the root data object, the first data objects, or the additional data objects. In some examples, the root data object is represented by a root node of the plurality of interconnected nodes, with the diagram branching out to include the other data objects (e.g., ending in leaf nodes).

In some examples, the method includes identifying, for a data object, one or more attributes, such as a nullability, a variant data object, an object path, a data type, or a functional component. Attributes may be presented via the user interface in association with a corresponding node of the plurality of interconnected nodes that represents the data object in the diagram.

The object reference structure may identify child data objects and parent data objects. It will be appreciated that some data objects may be both child data objects and parent data objects. For example, a particular data object is a child data object of a second data object and is also a parent data object of a third data object.

In some examples, the predetermined condition includes performing one or more of the secondary queries for each child data object from among the child data objects that has a corresponding parent data object that is not nullable within a context of the child data object. The term "nullability," as used herein, refers to a property of a data object's attribute that indicates whether it is permissible for the attribute to have a null (e.g., empty or undefined) value. In some examples, nullability also includes whether the attribute is optional. For example, for a particular child data object, the parent data object is nullable when the parent data object relates to a column or attribute of the child data object that can be set as null, while the parent data object is non-nullable when the particular column or attribute is not optional and should have a non-zero value.

In examples, where the diagram represents the root data object as a root node of a tree hierarchy, the secondary queries can be recursively executed until all leaf nodes meet a predetermined condition. For example, if all leaf nodes have parent nodes that are nullable, the secondary queries are ceased by the system and the object reference structure is finalized. In some cases, if a particular leaf node does not have a nullable parent, the system conducts one or more further secondary queries until a new leaf node is found that has a nullable parent.

By implementing predetermined conditions, such as the aforementioned stopping condition that stops the recursive search at nullable parent objects, the system can improve the purging process. For example, a nullable parent can indicate a logical endpoint in a data hierarchy where dependent data is not linked to higher-level structures in a strict manner, potentially reducing the scope of data that needs to be considered for purging. This approach can reduce computing requirements associated with purging operations while ensuring that a correct purge scope is identified.

The method may further include receiving, via the user interface, user input comprising an instruction to trigger a process based on the object reference structure. For example, the user input can include a purge instruction associated with at least part of the object reference structure. In response to receiving the user input, the system triggers execution of the process (e.g., a data purge to purge data from the database according to the purge instruction). In some examples, the purging process is improved through a user-friendly interface that provides a view of data objects covered, or potentially covered, by a purge, as well as relationships between them.

In some examples, the root data object, the first data objects, and the additional data objects are used to establish a purge scope, and the data purge is executed based on the purge scope. A user may specify a value or values associated with the root data object that is used to determine the data related to the in-scope data objects to purge. Other criteria, such as temporal constraints, can also be specified. For example, the user may wish to purge all data related to a particular data object value that are older than a defined period of time.

Examples described herein provide for automated conversion of object data from a first data format to a second data format. For example, the root data object, the first data objects, and the additional data objects are initially identified in object data of a first data format, such as JSON (JavaScript Object Notation), and then automatically converted to a second data format for use by a downstream system, such as a purging service. For example, the object data is converted from JSON format to XML (extensible Markup Language) format that allows the purging service to determine a purge scope (e.g., entries or records within the database covered by the data objects).

In some examples, the user is enabled to conveniently adjust or modify the object reference structure. For example, the system receives, via the user interface, user input to adjust at least one of the object reference structure or the graphical representation of the object reference structure. Based on a selected adjustment, the system automatically adjusts a purge scope associated with the purge instruction.

Examples described herein provide various technical solutions to technical problems. For example, problems can arise in identifying a correct scope of data objects. This process can be time-consuming and error-prone, and can result in relevant data objects being missed. These issues are addressed or alleviated through an automatic identification process according to examples in the present disclosure. The identification process can involve recursive queries and automatic analysis of data object attributes to identify additional data objects related to an initial set of data objects, thereby providing a complete and accurate object reference structure (e.g., as represented by a tree diagram).

Furthermore, examples in the present disclosure not only identify relevant data objects, but also provide an efficient solution to manage and visualize complex relationships between the data objects. For example, a user is enabled to easily understand or appreciate the interconnectedness of data objects, especially in large datasets with parent-child or nested relationships. In some examples, an object reference structure is presented as a graphical representation via a user interface. The graphical representation can include a diagram of nodes representing the data objects and their relationships, as well as metadata (e.g., data object attributes), aiding in clear visualization and verification of interconnected data objects. In this way, the user is provided with a decision-support tool that can be used to facilitate or improve a data purging process (or other data management process).

In some examples, the operation of a computing system is improved by automatically surfacing metadata, such as data object attributes (e.g., nullability, data types, object paths, or variant data object identifiers). This further aids a user to make informed decisions regarding data management based on characteristics of data objects.

For instance, immediately understanding whether a parent data object is nullable, without having to make further user selections or submit manual queries, can facilitate a decision-making process in data purging, ensuring that data integrity is maintained and database errors or anomalies are reduced. As another example, a functional component associated with a data object is automatically surfaced and presented together with a tree diagram that illustrates where the data object is positioned in the object reference structure, thereby obviating the need to perform additional searches to identify the functional component.

Examples described herein improve the functioning of a computing system by reducing errors or inconsistencies in databases resulting from incorrect or incomplete purge operations. Furthermore, the functioning of a computing system can be improved by allowing a user to visualize data objects, and to free up storage space in an accurate and effective manner.

When the effects in this disclosure are considered in aggregate, one or more of the methodologies described herein may obviate a need for certain efforts or resources that otherwise would be involved in the identification of data objects. Computing resources utilized by systems, databases, or networks may be more efficiently utilized or reduced, e.g., as a result of targeted and efficient data object identification, reducing the need for additional queries or analysis. Examples of such computing resources may include processor cycles, network traffic, memory usage, graphics processing unit (GPU) resources, data storage capacity, power consumption, and cooling capacity.

While examples in the present disclosure primarily focus on data purging operations, it is noted that object reference structures as described herein can, in at least some examples, also be utilized in other operations. For example, an object reference structure can be used as a decision-support tool to assess the impact of proposed changes on data when planning to modify database elements, thereby facilitating database management.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 108. A web client 110 (e.g., a browser) or a programmatic client 112 (e.g., an "app") may be hosted and executed on the user device 106.

An Application Program Interface (API) server 124 and a web server 126 provide respective programmatic and web interfaces to components of the server system 104. A specific application server 122 hosts a supply chain platform 128 and a data purging system 130, each of which includes components, modules, or applications. It is noted that the supply chain platform 128 and the data purging system 130 can be hosted via separate application servers in some examples.

The user device 106 can communicate with the application server 122, such as via the web interface supported by the web server 126 or via the programmatic interface provided by the API server 124. It will be appreciated that, although only a single user device 106 is shown in FIG. 1, a plurality of user devices may be communicatively coupled to the server system 104 in some examples. Further, while certain functions may be described herein as being performed at either the user device 106 (e.g., web client 110 or programmatic client 112) or the server system 104, the location of certain functionality either within the user device 106 or the server system 104 may be a design choice. Furthermore, while certain functions may be described herein as being performed at a particular system, such as the data purging system 130, the location of the functionality may also be a design choice. For instance, some functionality described with reference to the data purging system 130 can be performed by the supply chain platform 128 or by both the data purging system 130 and the supply chain platform 128.

The application server 122 is communicatively coupled to database servers 132, facilitating access to one or more information storage repositories, such as a database 134. In some examples, the database 134 includes storage devices that store information to be accessed, processed, modified, or deleted by the supply chain platform 128 or the data purging system 130.

The application server 122 accesses application data (e.g., application data stored by the database servers 132) to provide one or more applications or software tools to the user device 106 via a web interface 114 or an app interface 116. The supply chain platform 128 is an example of a platform with one or more applications or software tools, provided via the application server 122.

The supply chain platform 128 can facilitate the tracking, coordination, and execution of supply chain activities (e.g., ranging from procurement to distribution). In some examples, the supply chain platform 128 allows organizations to streamline and digitize their procurement lifecycle using a cloud-based architecture, integrating with the database 134 for fast processing of large datasets and real-time insights. Various data objects are created and used to manage and operate the supply chain platform 128. For example, various data objects, corresponding to real-world business entities or objects, can be mapped to tables in the database 134, and such tables (and thus their data objects) can be interconnected based on hierarchies, dependencies, or references.

In some examples, the supply chain platform 128 integrates with other systems to enhance functionality, such as interfacing with the data purging system 130 to ensure efficient data management. For instance, the supply chain platform 128 may utilize the data purging system 130 to remove outdated or unnecessary data, or data specifically requested to be removed by users, thereby improving system performance or compliance with data retention policies.

In some examples, the data purging system 130 is a centralized system configured to execute data purging operations on one or more storage systems associated with an enterprise based on defined purge policies or specific purge instructions. The data purging system 130 provides a platform to apply retention rules or other criteria for deleting obsolete, redundant, or unnecessary data. The data purging system 130 may delete specific or custom data items on request.

For example, the data purging system 130 handles requests to purge master data or transaction data associated with data objects created by users of the supply chain platform 128. In some examples, the supply chain platform 128 and the data purging system 130 work together to define a set of data objects that are in-scope for a particular data purge and to execute the data purge based on the purge scope.

It is noted that the supply chain platform 128 is merely an example of a platform or system that can benefit from features of the data purging system 130. The data purging system 130 can, for instance, operate to purge data associated with data objects related to other platforms or systems, such as human resources systems, enterprise resource planning (ERP) systems, or accounting systems.

In some examples, the application server 122 is part of a cloud-based platform provided by a software provider that allows the user 108 to utilize the tools of the supply chain platform 128, the data purging system 130, and, where applicable, other systems or subsystems (e.g., a human resources system, ERP system, or accounting system, as mentioned).

One or more of the application server 122, the database servers 132, the API server 124, the web server 126, and the supply chain platform 128 may each be implemented in a computer system, in whole or in part, as described below with respect to FIG. 8. In some examples, external applications (which may be third-party applications or other applications provided by the same software provider), such as an external server 118 executing on an external application 120, can communicate with the application server 122 via the programmatic interface provided by the API server 124. For example, a third-party application may support one or more features or functions on a website or platform hosted by a third party, or may perform certain methodologies and provide input or output information to the application server 122 for further processing.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
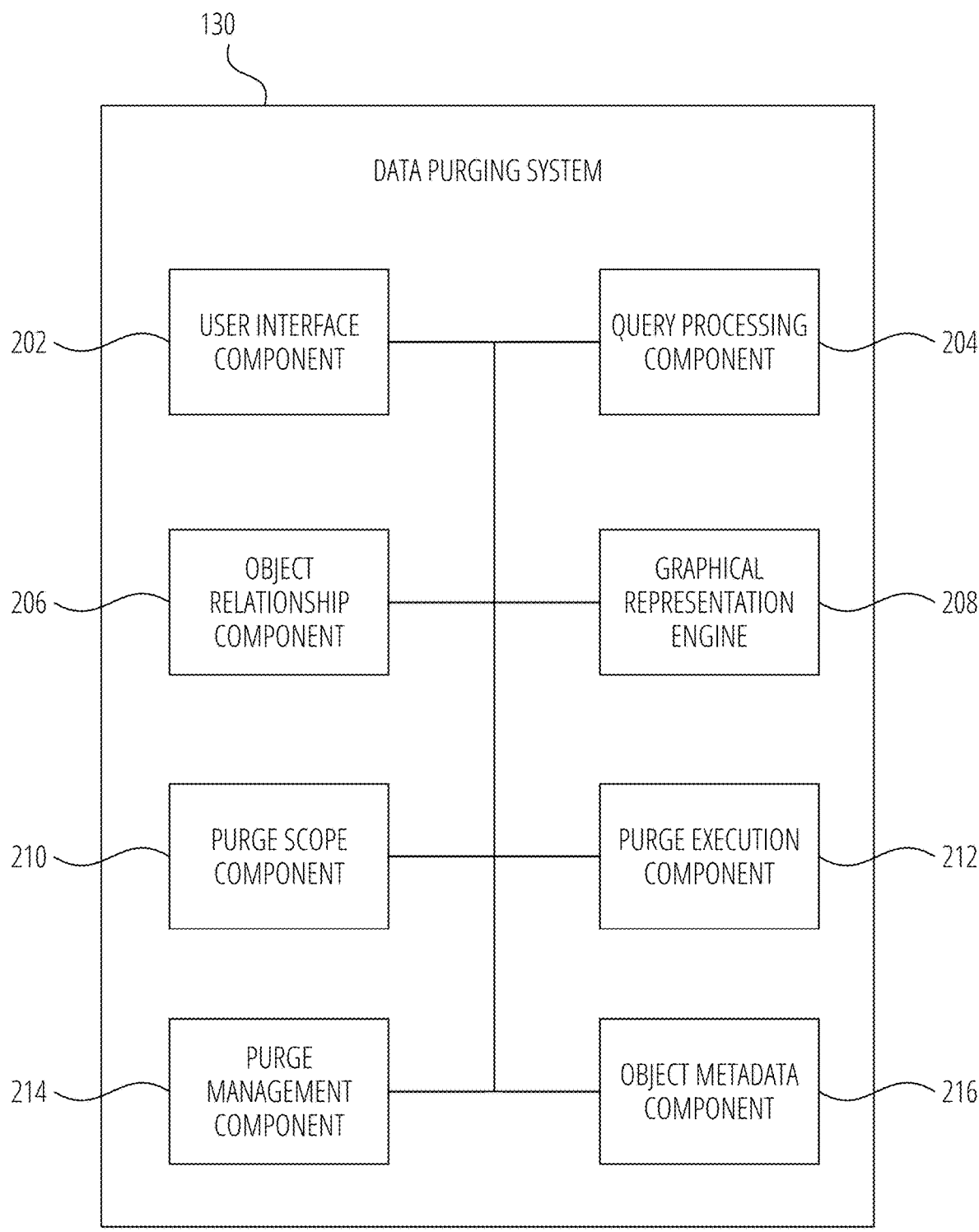
FIG. 2 is a block diagram of components of a data purging system, according to some examples.

FIG. 2 is a block diagram illustrating components of the data purging system 130 of FIG. 1, according to some examples. In FIG. 2, the data purging system 130 is shown to include a user interface component 202, a query processing component 204, an object relationship component 206, a graphical representation engine 208, a purge scope component 210, a purge execution component 212, a purge management component 214, and an object metadata component 216.

The user interface component 202 receives data sent to the data purging system 130 and transmits data from the data purging system 130. In some examples, the user interface component 202 provides a user interface (e.g., a graphical user interface) that enables a user to create, manage, track, visualize, or adjust data purges. The user can be an end user, such as a user of the supply chain platform 128 (e.g., the user 108 of FIG. 1), or an administrator (e.g., a user that receives a purge request from an end user and manages the purging process).

The user interface component 202 can receive user inputs, such as commands or configurations for data purging, and display information relevant to a data purging processes, including visual representations of object reference structures and feedback on operations performed. In some examples, the user interface component 202 provides a graphical user interface that allows users to view object reference structures related to data objects covered or potentially covered by a purge. For example, the object reference structure can provide an indication of data objects potentially affected by a purge prior to triggering of the actual purge operations. The user interface can provide further tools such as filters, search bars, and interactive data maps.

The query processing component 204 handles the execution of queries to identify data objects. In some examples, the query processing component 204 receives an identifier of a root data object, and performs queries to identify further data objects to include in an object reference structure. The object relationship component 206 generates the object reference structure based on results obtained by the query processing component 204. The object relationship component 206 can help users understand which data objects are linked to a root data object, and how data objects are interconnected. In some examples, the object relationship component 206 can dynamically update object reference structures based on changes in a database (e.g., the database 134), aiding users in making informed decisions.

The graphical representation engine 208 of the data purging system 130 generates visual representations of data objects and relationships. In some examples, the graphical representation engine 208 provides diagrams that users can view and, in some cases, manipulate, to better understand the data connections and to assess the impact of potential purging activities. For example, the graphical representation engine 208 can provide interactive diagrams that illustrate not only the relevant data objects but also relevant attributes of those data objects, as discussed in more detail with reference to the object metadata component 216 below. The graphical representations generated by the graphical representation engine 208 are presented to the user via the user interface component 202.

The purge scope component 210 operates to define or modify a purge scope associated with a purge instruction. For example, once the relevant data objects have been identified, the purge scope component 210 traverses tables in the database 134 that are mapped to those data objects to identify, based on purge criteria, which records or entries to purge according to the purge instruction. In some examples, in addition to the object reference structure, the graphical representation engine 208 generates a visual indication of records to be affected by a purge based on current purge criteria (e.g., number of records affected or storage space affected).

The purge execution component 212 is responsible for the purging of data. Purging can include hard purges, soft purges, adjustment of records based on the purging of related records, or combinations thereof. In some examples, the purge execution component 212 ensures that data purges are performed securely and in compliance with data protection regulations, providing confirmations or receipts of successful purges. In the context of relational databases, examples of purging operations can include one or more of:

Cascading delete: Delete all records in dependent tables that are linked to records in a main tables or tables to be purged.

Setting to null: Instead of deleting dependent records, their foreign key fields are set to null. This technique can be used, for example, when the rest of the data in the dependent records still hold value independently of the primary record.

Default value: Set the foreign key fields to a default value, which can be used to indicate a special condition, such as "archived."

The purge management component 214 oversees the execution and management of the data purging processes. For example, the purge management component 214 receives a new purge request, or job, and initiates the purge operations based on the defined scope, managing the tasks involved in the purging process, such as scheduling purges, monitoring progress, and handling exceptions. In some examples, the purge management component 214 also ensures that data purging activities are logged and that the integrity of remaining data is maintained post-purge.

The object metadata component 216 of the data purging system 130 is responsible for identifying and providing access to metadata associated with surfaced data objects. In some examples, the graphical representation engine 208 and the user interface component 202 cause presentation of attributes of data objects together with the object reference structure for review by a user (e.g., on the user device 106 via the web interface 114). Where attributes are shown in association with nodes of a diagram, they can be referred to as "node characteristics." Examples of such attributes, or "node characteristics," include:

Nullability: metadata concerning nullability of a data object helps in understanding whether a data object or its attributes can be set to null.

Variant data objects: metadata concerning whether a data object in the object reference structure has one or more variant data objects can help in understanding whether the purge scope should be adjusted. A variant data object may include a version of a data object that exists in multiple forms or variations.

Object paths: the object metadata component 216 can surface the object path of a data object for presentation to the user. The object path can also be provided by the object metadata component 216 to other components, such as the purge scope component 210 or the purge execution component 212.

Functional component: the object metadata component 216 can detect a functional component or functional module associated with a particular data object. For example, the object metadata component 216 detects that a particular data object is used in a module of the supply chain platform 128 (e.g., an "invoicing module" or a "tax module") and then causes this to be indicated to the user.

Data type: metadata that describes a type of data stored via the data object can be surfaced by the object metadata component 216. For example, the metadata can indicate that a particular data object is associated with "master data" or "transaction data," thereby helping a user to understand how purging will affect data in the database 134.

In some examples, at least some of the components shown in FIG. 2 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

In some examples, certain components or subsystems shown in FIG. 1 or FIG. 2 are implemented (individually or jointly) as microservices. A microservice subsystem (e.g., a microservice application) may have components that enable it to operate independently and communicate with other services. Example components of a microservice subsystem include:

Function logic: The function logic implements the functionality of the microservice subsystem, representing a specific capability or function that the microservice provides.

API interface: Microservices may communicate with each other components through well-defined APIs or interfaces, using lightweight protocols such as representational state transfer (REST) or messaging.

Data storage: A microservice subsystem may be responsible for its own data storage, which may be in the form of a database, cache, or other storage mechanism (e.g., using the database 134). This enables a microservice subsystem to operate independently of other microservices.

Service discovery: Microservice subsystems may find and communicate with other microservice subsystems of the server system 104. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

Figure 3:
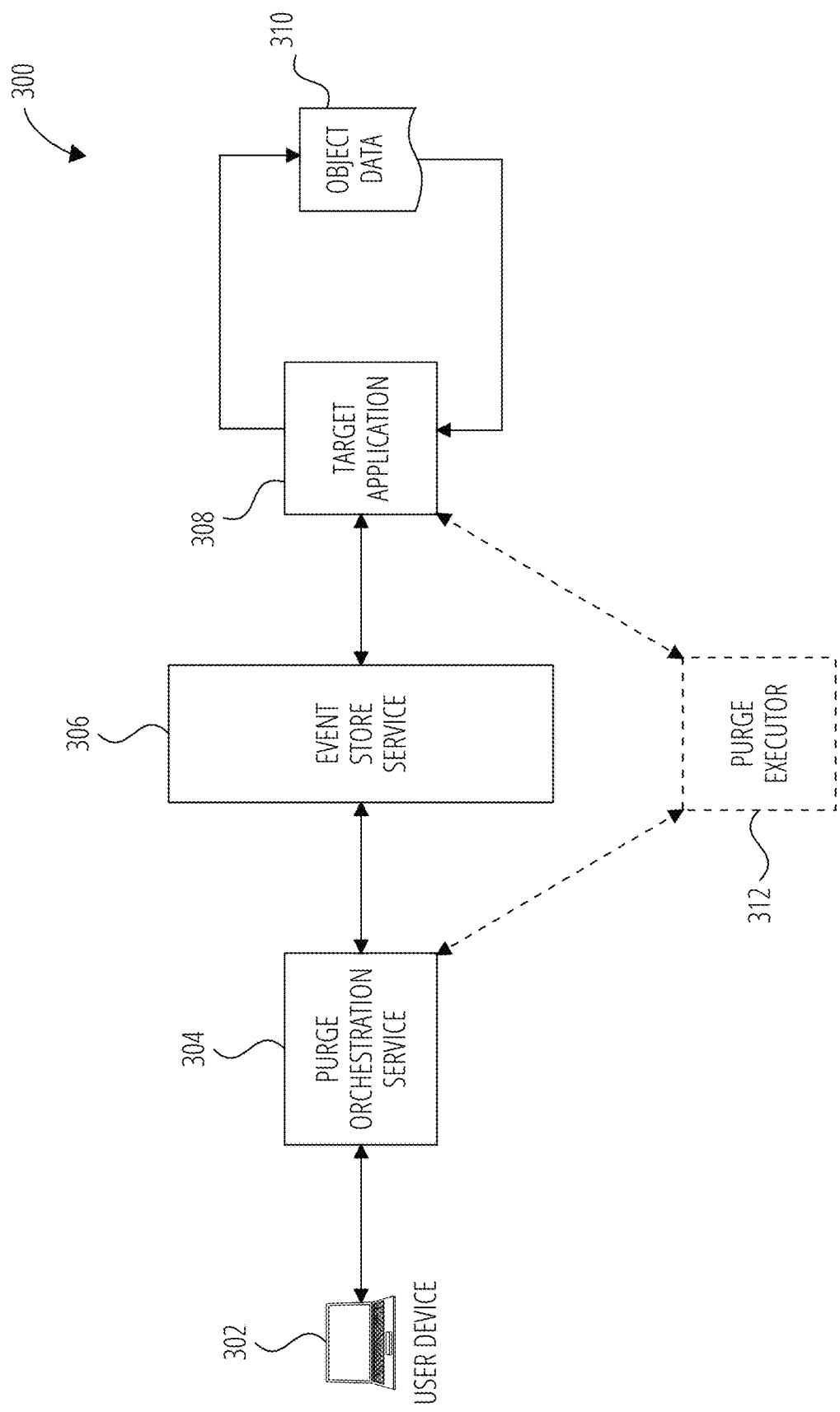
FIG. 3 diagrammatically illustrates interactions between a user device, a purge orchestration service, an event store service, and a target application, according to some examples.

FIG. 3 is a diagram 300 that shows interactions between a user device 302, a purge orchestration service 304, an event store service 306, and a target application 308, according to some examples. In some examples, the purge orchestration service 304 and the target application 308 performs functions of the data purging system 130 of FIG. 1 (e.g., as described with reference to FIG. 2).

The purge orchestration service 304 provides a user interface at the user device 302 (e.g., via a web interface, such as the web interface 114 of FIG. 1 that can be provided at the user device 106). The user interface allows a user to create or submit purge requests (e.g., by uploading purge policies or creating once-off purge jobs). The user device 302 is, for example, a personal computer, a laptop, a tablet, or a mobile phone.

In some examples, the purge orchestration service 304 stores a Unit of Purge (UOP) document or file that captures data objects forming part of a purge, or other aspects of purge scope. The purge orchestration service 304 thus publishes an object scope or purge scope. The user can use the UOP document to trigger a data purge, with the purge orchestration service 304 managing the relevant purge job or jobs and tracking lifecycle events for the purge process.

Prior to the creation of a UOP document, in some examples, the user submits one or more purge criteria via the user device 302 to the purge orchestration service 304. In some examples, the criteria identify a root data object associated with the target application 308. For example, the user requests purging of all data related to a particular "Customer_ID" from the target application 308. The target application 308 is, for instance, a buyer application of the supply chain platform 128.

In order to obtain an accurate and complete UOP document, the purge orchestration service 304 transmits an identification request message to the target application 308 via the event store service 306. The event store service 306 is a messaging service that publishes messages, such as identification requests or purge jobs. In some examples, the target application 308 has a listener component that detects identification requests or jobs by listening for an event from the event store service 306.

The target application 308 then proceeds to identify data objects that have reference relationships with the root data object and may thus be impacted by the proposed purge, depicted as object data 310 in FIG. 3. Examples of queries that are performed to identify the relevant data objects are described elsewhere. In some examples, the target application 308 generates an object reference structure based on the identified data objects. The object reference structure may form part of the object data 310.

The purge orchestration service 304 then receives the object data 310 from the target application 308 (e.g., via the event store service 306) and presents it to the user at the user device 302 by way of a graphical representation. For example, the object reference structure is presented as a tree diagram. The purge orchestration service 304 also generates the UOP document based on the identified objects or the object reference structure.

The user may select the UOP document via the user device 302 for a purge, causing creation of a purge job that is published by the purge orchestration service 304 to the event store service 306. The target application 308 receives and starts processing the job by traversing the data objects in the defined purge scope and performing purging. In some examples, the target application 308 instructs a dedicated purge executor 312 to perform the data purge. For example, the purge executor 312 is configured to perform a data purge according to a provided purge scope and in line with Data Protection and Privacy (DPP) requirements. The purge executor 312 may, in some cases, perform a soft purge within all relevant tables covered by the object data 310 (and meeting the relevant purge criteria) and then, after a grace period, perform a hard purge.

The target application 308 may communicate directly with the purge executor 312 in some examples. In other examples, the target application 308 communicates with the purge executor 312 via the purge orchestration service 304, with the purge orchestration service 304 acting as an intermediary to hand over purging tasks to the purge executor 312.

In some examples, the object data 310 (e.g., together with other information of a purge scope) is pushed to the purge executor 312 in a predetermined format that enables the purge executor 312 to automatically launch its purge operations without needing further adjustment or user input. For example, the object data 310 is initially generated in JSON format and automatically converted to XML format for storage in a repository from which the purge executor 312 initiates purging. This conversion not only ensures compatibility with a purging service such as the purge executor 312 but also enhances flexibility and portability of the data, allowing it to be easily shared, validated, and processed across different platforms and tools.

It is noted that data can be purged from records in the database 134 associated with the target application 308, as well as other related applications. For example, the target application 308 can have upstream and downstream applications that are also part of the supply chain platform 128, and use related data objects.

In some examples, at least some of the components shown in FIG. 3 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Figure 4:
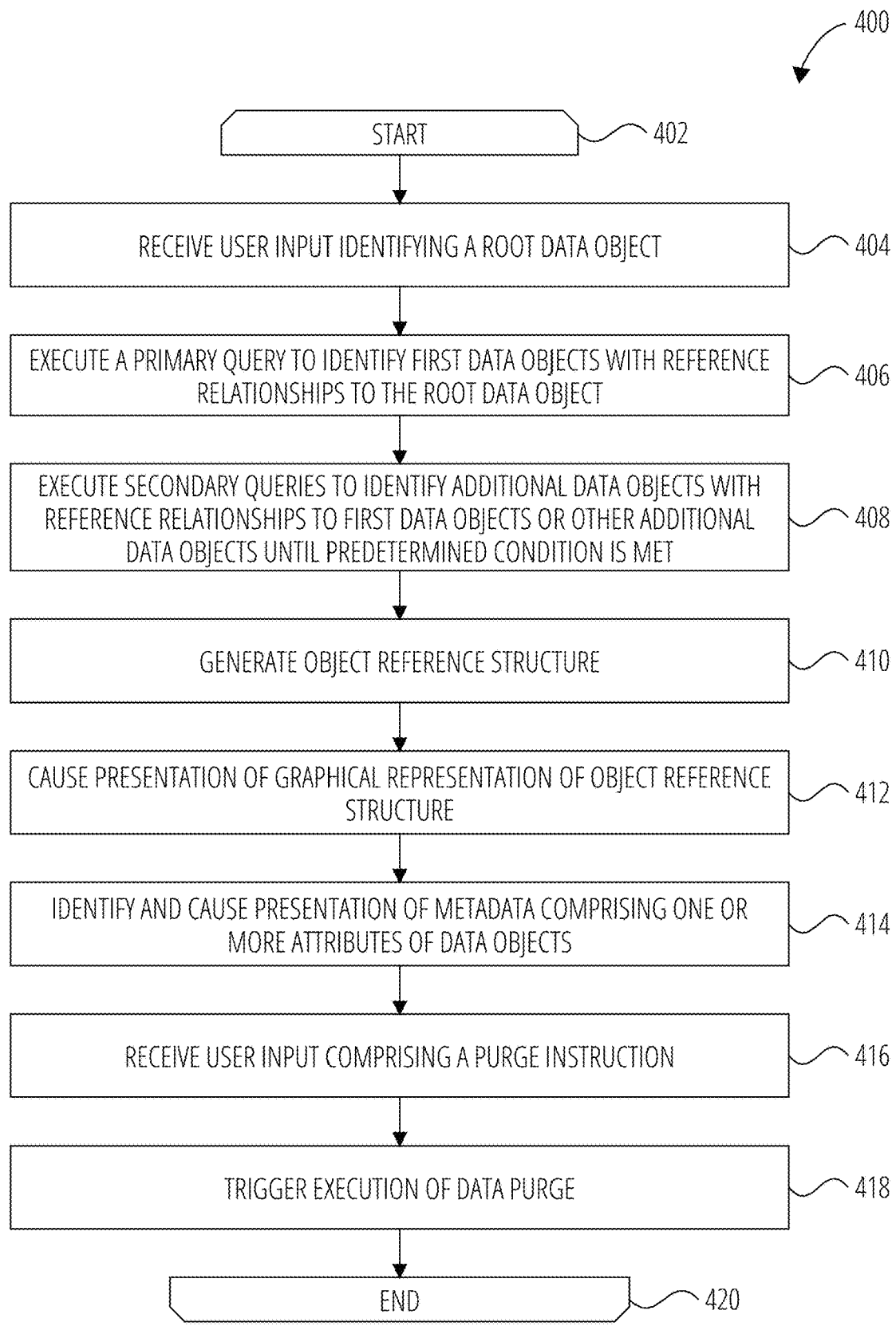
FIG. 4 is a flowchart illustrating operations of a method suitable for automatically generating an object reference structure, according to some examples.

FIG. 4 is a flowchart illustrating operations of a method suitable for automatically generating an object reference structure, according to some examples. By way of example and not limitation, aspects of the method 400 may be performed by components, devices, or systems as shown in FIG. 1 and FIG. 2, and they may thus be referenced below. However, it will be appreciated that aspects of the method 400 may also be performed by other components, devices, or systems, such as those shown in FIG. 3.

The method 400 commences at opening loop operation 402 and proceeds to operation 404, where the data purging system 130 receives user input that identifies a root data object. For example, the user 108 transmits, via the user device 106, input that indicates a request (or possible request) to purge all data related to a particular data object based on a field/column match in the database 134. Merely as an example, in the context of the supply chain platform 128, the user indicates that all data that has reference to a "General_Ledger" data object should be purged from a core procurement subsystem of the supply chain platform 128. In other words, the root data object is part of the main criteria provided by the user.

The data purging system 130 proceeds to execute queries to identify a scope of data objects associated with the root data object. In some examples, and as shown in FIG. 4, the data purging system 130 performs a primary query at operation 406 and performs secondary queries at operation 408. The operation 406 identifies first data objects with reference relationships to the root data objects. For example, the first data objects are directly related to the root data object through foreign key relationships. One or more first data objects may also be nested relative to the root data object.

The operation 408 identifies additional data objects with reference relationships to the first data objects, or to already identified additional data objects. Again, the additional data objects may be dependent data objects (e.g., via foreign keys) or nested data objects. In some examples, the operation 408 is performed recursively by the data purging system 130 until a predetermined condition is met.

As mentioned, the predetermined condition can include performing the secondary query for each child data object that has a corresponding (already identified) parent data object that is not nullable within a context of the child data object. By analyzing the nullability of parent objects, the data purging system 130 can ensure that no child data objects are left without a valid parent, which could lead to orphan records. However, other predetermined conditions can be applied in other examples. For example, the predetermined condition can involve recursively performing the secondary queries until all related (e.g., dependent or nested) data objects are found, irrespective of relative nullability.

The data purging system 130 may build a library or structure based on the located data objects and their relationships. For example, and as shown at operation 410 of the method 400, the data purging system 130 generates an object reference structure that represents the reference relationships among the identified data objects. At operation 412, the data purging system 130 causes presentation of a graphical representation of the object reference structure (e.g., at the user device 106 and via the web interface 114). For example, the object reference structure is presented as a diagram with nodes representing respective data objects.

In some examples, the method 400 further includes identifying, by the data purging system 130, metadata of data objects included in the graphical representation, and causing presentation thereof together with the graphical representation of the object reference structure (at operation 414). For example:

The data purging system 130 identifies, for each child data object that has been detected, a nullability of the parent data object of that child data object within a context of the child data object. An indication of the nullability is then presented at the user device 106.

The data purging system 130 identifies variant data objects of detected data objects, and presents them to the user at the user device 106.

The data purging system 130 identifies an object path of each data object (e.g., within the supply chain platform 128 or the database 134), and presents the object data at the user device 106.

The data purging system 130 identifies a data type of each data object (e.g., master or transactional), and presents the data type at the user device 106.

The data purging system 130 identifies a functional component of each data object, and indicates the functional component at the user device 106. This may include, for example, functional modules within the supply chain platform 128 (e.g., an invoicing module or an ordering module), or other logical groupings of data items that have some shared significance or purpose within a computing environment. In some examples, the indication, to the user, of functional components, allows the user to understand that a data purge may affect multiple subsystems or applications. For example, the data purging system 130 presents, at the user device 106, the graphical representation of the object reference structure, together with an indication of the applications associated with respective data objects (e.g., nodes) in the object reference structure.

According to some examples, the method 400 includes receiving, by the data purging system 130, second user input comprising a purge instruction at operation 416. The second user input can, for example, confirm the scope of data objects as indicated in the object reference structure, or provide for an adjustment to the scope.

At operation 418, the data purging system 130 triggers execution of a data purge based on the purge instruction. Using the aforementioned example, the data purging system 130 causes purging, from the database 134, of all records from the tables associated with the object reference structure (e.g., the tables that are mapped to the data objects in the object reference structure) that have reference to the "General_Ledger" object. In some examples, the purge instruction includes additional criteria, such as temporal constraints. For example, the records related to the "General_Ledger" object should only be purged if they are older than one year. The method 400 concludes at closing loop operation 420.

Figure 5:
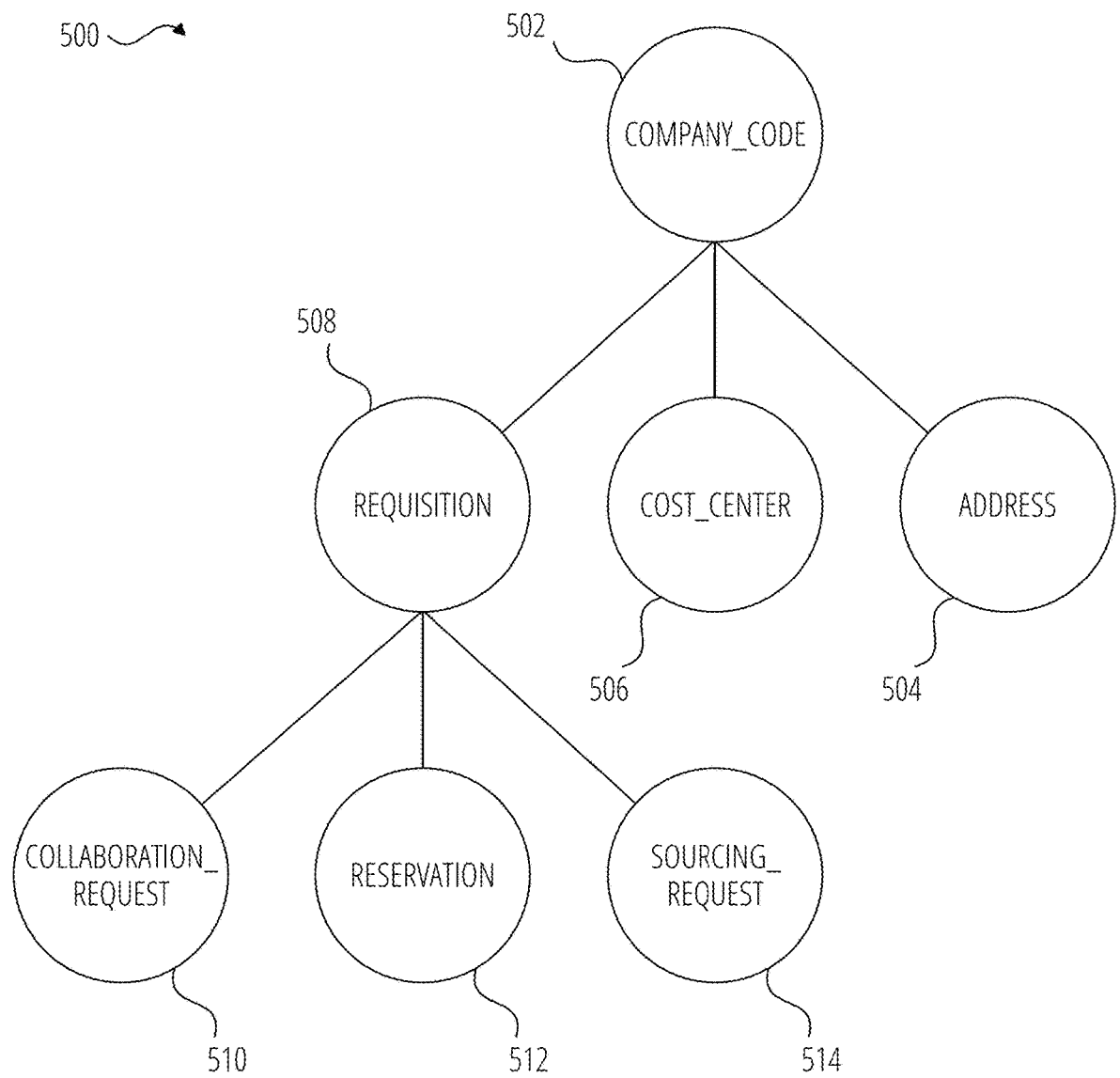
FIG. 5 is a tree diagram representing an object reference structure, according to some examples.

FIG. 5 is a tree diagram representing an object reference structure 500, according to some examples. The object reference structure 500 includes a plurality of nodes.

A root node 502 represents the root data object ("Company_Code") for the specific object reference structure 500. The root node 502 represents, for example, a database table that holds data related to company identifiers used within a business system. As the root node 502, it serves as a primary reference point for other data objects that are linked based on data relationships.

A set of first data objects that have direct reference relationships with the root data object are represented by three nodes directly below the root node 502: a leaf node 504 ("Address"), a leaf node 506 (""Cost_Center"), and an intermediate node 508 ("Requisition").

The nodes for the "Address" and "Cost_Center" data objects are indicated as leaf nodes since they have no connected nodes below them. The leaf node 504 corresponds, for example, to a database table containing address details associated with the company identifiers. As a leaf node, it indicates that this data object does not have further dependencies that are relevant within the context of the specific object reference structure 500. The leaf node 506 corresponds, for example, to a database table indicating that each cost center is associated with a particular company identifier, without further downstream dependencies in the specific object reference structure 500.

The node for "Requisition" is intermediate, since three connected nodes are provided below it: a leaf node 510 ("Collaboration_Request"), a leaf node 512 ("Reservation"), and a leaf node 514 ("Sourcing_Request"). Merely as an example, the leaf node 510 corresponds to a database table listing collaboration requests, and the dependency indicates that collaboration requests are dependent on requisition data. Similar dependencies can exist for the leaf node 512 and the leaf node 514.

The object reference structure 500 illustrates relationships among the various data objects associated with the root data object that is represented by the root node 502, including both direct and indirect references, as discussed above. In some examples, each node represents a "purgeable candidate," each of which is mapped to a database table (e.g., in the database 134 of FIG. 1). In other words, the object reference structure 500 can indicate which data objects will be affected by a potential purge. This structure aids in understanding how data objects are interconnected and the dependencies that exist among them, which is useful for tasks such as data purging (or analysis or management of data that does not necessarily involve purging).

As mentioned, the identification of at least some of the nodes (e.g., the leaf node 504, the leaf node 506, the leaf node 510, the leaf node 512, or the leaf node 514) can involve a recursive querying process that is performed by the data purging system 130 until a node is reached that has a nullable parent node.

It is noted that the object reference structure 500 of FIG. 5 is shown with three hierarchical levels and a total of seven nodes primarily to provide a relatively simple example, and that other object reference structures can include more nodes, more hierarchical levels, or more complex interconnections between nodes. For example, the object reference structure 500 can include various other nodes corresponding to further data objects, such as "Asset," "Company_Code_Tax_Registration," "General_Ledger," "Shipping_Notice," "Purchase_Order," or "Order_Confirmation,"

Figure 6:
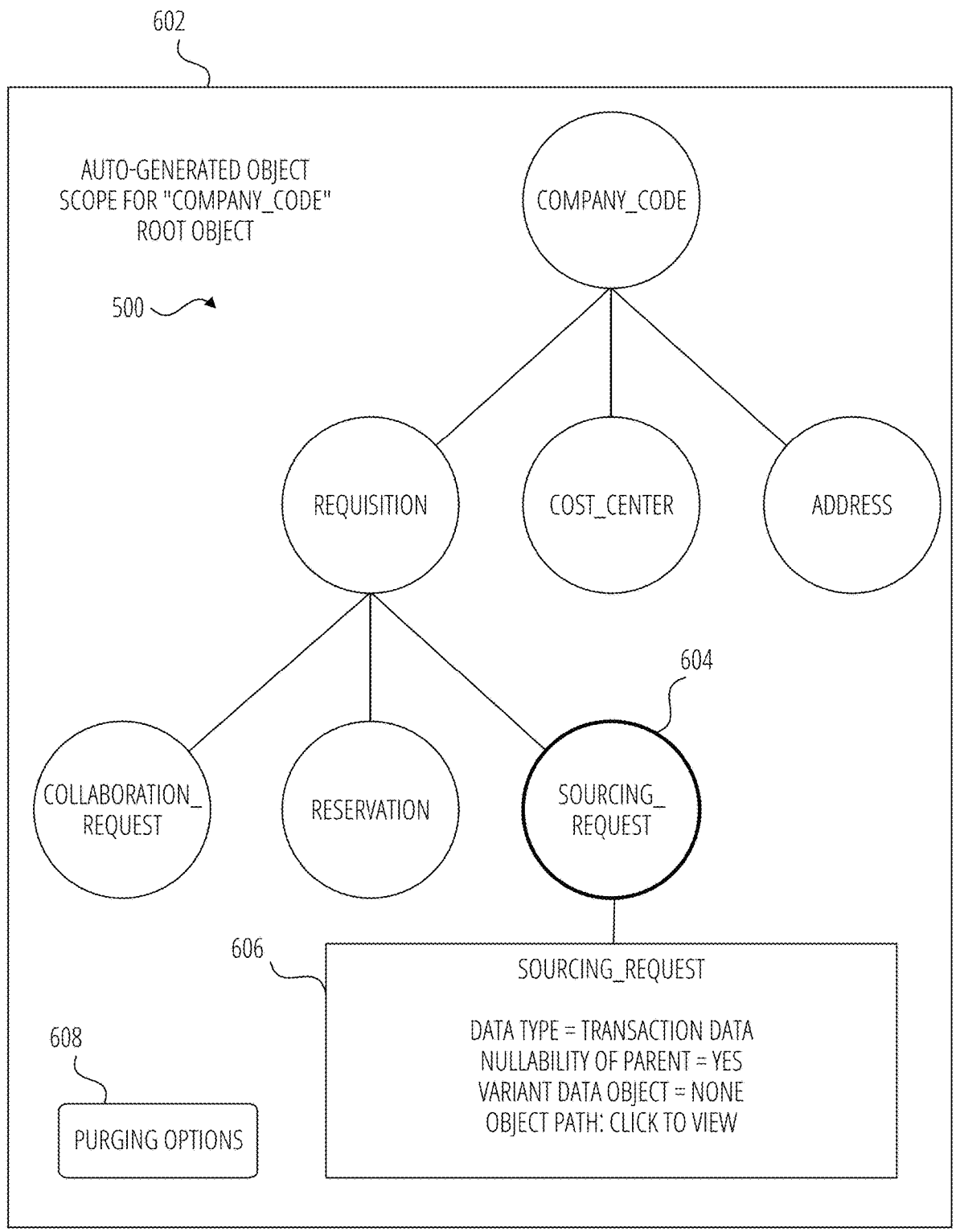
FIG. 6 is a user interface diagram illustrating a graphical user interface in which a tree diagram representing an object reference structure is presented, according to some examples.

FIG. 6 is a user interface diagram illustrating a graphical user interface 602, according to some examples. The graphical user interface 602 presents, at a user device (e.g., the user device 106 of FIG. 1), a tree diagram representing an object reference structure. Merely as an example, the object reference structure 500 of FIG. 5 is also depicted in FIG. 6.

In some examples, the data purging system 130, or another system, such as the supply chain platform 128, provides a web page (e.g., via the web interface 114 of FIG. 1) where a user can specify a root data object to trigger generation of an object reference structure. For example, the user specifies that "Company_Code" is the root data object, and is presented with the graphical user interface 602 of FIG. 6 in response thereto.

The user may be enabled to select the relevant root data object from a list of selectable root data objects presented in the graphical user interface 602. In some examples, the data purging system 130 accesses a database schema of the database 134 to retrieve the list of the available data objects.

In addition to presentation of the various nodes of the object reference structure 500 (as described with reference to FIG. 5) the graphical user interface 602 presents, at the user device, metadata that includes attributes of one or more of the nodes.

As an example, FIG. 6 illustrates attributes 606 of a selected node 604, which corresponds to the leaf node 514 that represents the "Sourcing_Request" data object. For example, the user can select the selected node 604, or hover a cursor over the selected node 604, to cause presentation of the attributes 606. In other examples, the attributes 606 are automatically presented together with the nodes without having to be triggered by further user input.

The example attributes 606 shown in FIG. 6 are:

Data type: the attributes 606 indicate that the selected node 604 relates to transaction data (e.g., as opposed to master data).

Nullability: the attributes 606 indicate that the selected node 604 has a nullable parent. For example, the value for "Requisition" is optional within a table that is mapped to the selected node 604.

Variant data object: the attributes 606 indicate that no variant data objects of the "Sourcing_Request" data object have been found. However, in some cases, a variant of the data object might represent a different version of the data object that is tailored for specific conditions or requirements within a business process. For example, "Sourcing_Request" might have a variant called "Sourcing_Request_International."

Object path: the attributes 606 further enable a user to easily view the object path associated with the relevant data object. The object path may be a repository path to a structure definition of the relevant data object. The object path may be presented together with an indication of the functional module or functional component of the relevant data object.

The graphical user interface 602 further includes a purging options button 608. Selection of the purging options button 608 can, for example, present additional options, such as further user interface elements that enable adjustment of the object reference structure 500 or a purge scope associated with the object reference structure 500 (e.g., by adding or removing criteria), as well as initiation or scheduling of a purge job related to the object reference structure 500.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: receiving, via a user interface, first user input identifying a root data object; in response to receiving the first user input: executing a primary query to identify, in a database, first data objects with reference relationships to the root data object, and recursively executing secondary queries to identify, in the database, additional data objects with reference relationships to one or more of the first data objects or to any other additional data object identified in a previous one of the secondary queries until a predetermined condition is met; generating an object reference structure based on the reference relationships among the root data object, the first data objects, and the additional data objects; causing presentation, via the user interface, of a graphical representation of the object reference structure; receiving, via the user interface, second user input comprising a purge instruction associated with at least part of the object reference structure; and in response to receiving the second user input, triggering execution of a data purge to purge data from the database according to the purge instruction.

In Example 2, the subject matter of Example 1 includes, wherein the database comprises a relational database, and each data object from among the root data object, the first data objects, and the additional data objects is mapped to a table in the database.

In Example 3, the subject matter of any of Examples 1-2 includes, wherein the graphical representation represents the object reference structure as a diagram that comprises a plurality of interconnected nodes, each of the plurality of interconnected nodes represents a respective one of the root data object, the first data objects, or the additional data objects, and the root data object is represented by a root node of the plurality of interconnected nodes in the diagram.

In Example 4, the subject matter of Example 3 includes, the operations further comprising: identifying, for a data object represented in the object reference structure, one or more attributes comprising at least one of a nullability, a variant data object, an object path, a data type, or a functional component; and causing presentation, via the user interface, of the one or more attributes in association with a corresponding node of the plurality of interconnected nodes that represents the data object in the diagram.

In Example 5, the subject matter of any of Examples 1-4 includes, wherein the object reference structure identifies child data objects and parent data objects, and wherein the predetermined condition comprises performing one or more of the secondary queries for each child data object from among the child data objects that has a corresponding parent data object, from among the parent data objects, that is not nullable within a context of the child data object.

In Example 6, the subject matter of any of Examples 1-5 includes, the operations further comprising: identifying a data object from among the first data objects and the additional data objects as a child data object of a parent data object from among the root data object, the first data objects, or the additional data objects; determining a nullability of the parent data object of the child data object within a context of the child data object; and causing presentation, via the user interface, of the nullability together with the graphical representation of the object reference structure.

In Example 7, the subject matter of any of Examples 1-6 includes, the operations further comprising: identifying an object path of a data object from among the root data object, the first data objects, and the additional data objects; and causing presentation, via the user interface, of the object path of the data object together with the graphical representation of the object reference structure.

In Example 8, the subject matter of any of Examples 1-7 includes, the operations further comprising: determining a data type of a data object from among root data object, the first data objects, and the additional data objects; and causing presentation, via the user interface, of the data type together with the graphical representation of the object reference structure.

In Example 9, the subject matter of any of Examples 1-8 includes, wherein the first user input or the second user input further comprises a value for the root data object, the operations further comprising: using the value in addition to at least a subset of data objects from among the root data object, the first data objects, and the additional data objects to establish a purge scope associated with the purge instruction; and executing the data purge based on the purge scope.

In Example 10, the subject matter of Example 9 includes, wherein the root data object, the first data objects, and the additional data objects are identified in object data of a first data format, the operations further comprising: converting at least some of the object data from the first data format to a second data format to obtain converted object data; and transmitting the converted object data in the second data format to a purging service prior to execution of the data purge.

In Example 11, the subject matter of any of Examples 1-10 includes, the operations further comprising: receiving, via the user interface, third user input to adjust at least one of the object reference structure or the graphical representation of the object reference structure; and adjusting a purge scope associated with the purge instruction based on the third user input.

In Example 12, the subject matter of any of Examples 1-11 includes, wherein the purge instruction is associated with one or more temporal constraints that are used to establish a purge scope associated with the purge instruction.

In Example 13, the subject matter of any of Examples 1-12 includes, wherein the reference relationships among the root data object, the first data objects, and the additional data objects include one or more data object dependencies and one or more nested object relationships.

In Example 14, the subject matter of any of Examples 1-13 includes, the operations further comprising: generating, from a database schema of the database, a list of selectable root data objects, wherein the first user input comprises a selection of the root data object from the list of selectable root data objects.

Example 15 is a method comprising: receiving, via a user interface, first user input identifying a root data object; in response to receiving the first user input: receiving, via a user interface, first user input identifying a root data object; in response to receiving the first user input: executing a primary query to identify, in a database, first data objects with reference relationships to the root data object, and recursively executing secondary queries to identify, in the database, additional data objects with reference relationships to one or more of the first data objects or to any other additional data object identified in a previous one of the secondary queries until a predetermined condition is met; generating an object reference structure based on the reference relationships among the root data object, the first data objects, and the additional data objects; causing presentation, via the user interface, of a graphical representation of the object reference structure; receiving, via the user interface, second user input comprising a purge instruction associated with at least part of the object reference structure; and in response to receiving the second user input, triggering execution of a data purge to purge data from the database according to the purge instruction.

In Example 16, the subject matter of Example 15 includes, wherein the database comprises a relational database, and each data object from among the root data object, the first data objects, and the additional data objects is mapped to a table in the database.

In Example 17, the subject matter of any of Examples 15-16 includes, wherein the graphical representation represents the object reference structure as a diagram that comprises a plurality of interconnected nodes, each of the plurality of interconnected nodes represents a respective one of the root data object, the first data objects, or the additional data objects, and the root data object is represented by a root node of the plurality of interconnected nodes.

Example 18 is one or more non-transitory computer-readable media storing computer-executable instructions that, when executed by a computing system, cause the computing system to perform operations comprising: receiving, via a user interface, first user input identifying a root data object; in response to receiving the first user input: executing a primary query to identify, in a database, first data objects with reference relationships to the root data object, and recursively executing secondary queries to identify, in the database, additional data objects with reference relationships to one or more of the first data objects or to any other additional data object identified in a previous one of the secondary queries until a predetermined condition is met; generating an object reference structure based on the reference relationships among the root data object, the first data objects, and the additional data objects; causing presentation, via the user interface, of a graphical representation of the object reference structure; receiving, via the user interface, second user input comprising a purge instruction associated with at least part of the object reference structure; and in response to receiving the second user input, triggering execution of a data purge to purge data from the database according to the purge instruction.

In Example 19, the subject matter of Example 18 includes, wherein the database comprises a relational database, and each data object from among the root data object, the first data objects, and the additional data objects is mapped to a table in the database.

In Example 20, the subject matter of any of Examples 18-19 includes, wherein the graphical representation represents the object reference structure as a diagram that comprises a plurality of interconnected nodes, each of the plurality of interconnected nodes represents a respective one of the root data object, the first data objects, or the additional data objects, and the root data object is represented by a root node of the plurality of interconnected nodes.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 7:
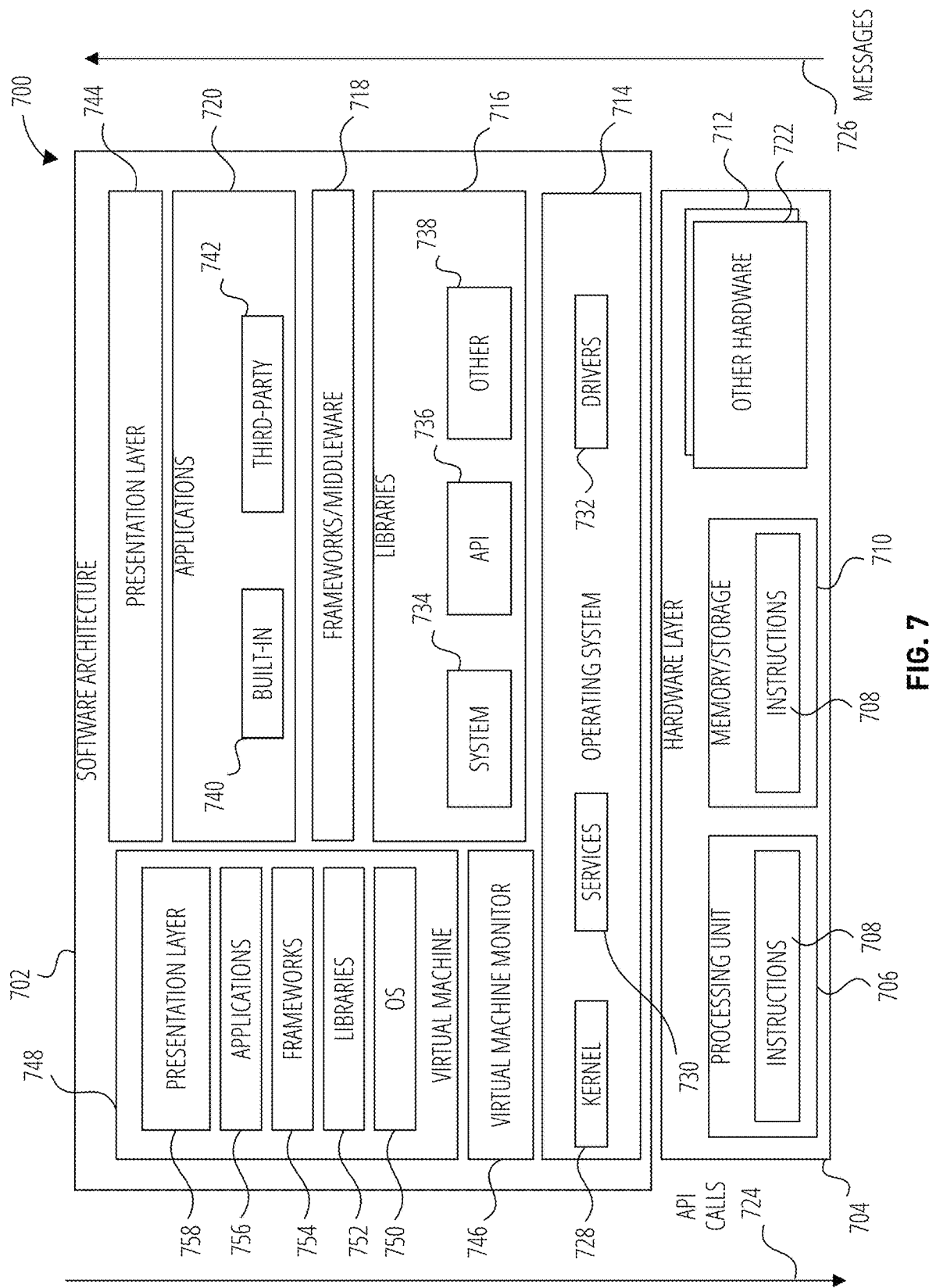
FIG. 7 is a block diagram showing a software architecture for a computing device, according to some examples.

FIG. 7 is a block diagram 700 showing a software architecture 702 for a computing device, according to some examples. The software architecture 702 may be used in conjunction with various hardware architectures, for example, as described herein. FIG. 7 is merely a non-limiting illustration of a software architecture, and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 and other hardware 722 which represent any other hardware of the hardware layer 704, such as the other hardware illustrated as part of the software architecture 702.

In the architecture of FIG. 7, the software architecture 702 may be conceptualized as a stack of layers where each layer provides particular functionality. For example, the software architecture 702 may include layers such as an operating system 714, libraries 716, frameworks/middleware layer 718, applications 720, and presentation layer 744. Operationally, the applications 720 or other components within the layers may invoke API calls 724 through the software stack and access a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the software architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 716 may provide a common infrastructure that may be utilized by the applications 720 or other components or layers. The libraries 716 typically provide functionality that allows other software modules to perform tasks in an easier fashion than to interface directly with the underlying operating system 714 functionality (e.g., kernel 728, services 730 or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks/middleware layer 718 may provide a higher-level common infrastructure that may be utilized by the applications 720 or other software components/modules. For example, the frameworks/middleware layer 718 may provide various graphic user interface (GUI) functions, high-level resource management, high-level location services, and so forth. The frameworks/middleware layer 718 may provide a broad spectrum of other APIs that may be utilized by the applications 720 or other software components/modules, some of which may be specific to a particular operating system or platform.

The applications 720 include built-in applications 740 or third-party applications 742. Examples of representative built-in applications 740 may include, but are not limited to, a contacts application, a browser application, a book reader application, a location application, a media application, a messaging application, or a game application. Third-party applications 742 may include any of the built-in applications as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built in operating system functions (e.g., kernel 728, services 730 or drivers 732), libraries (e.g., system libraries 734, API libraries 736, and other libraries 738), and frameworks/middleware layer 718 to create user interfaces to interact with users of the system. Alternatively, or additionally, in some systems, interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine as well as the interface with the host operating system (e.g., operating system 714). A software architecture executes within the virtual machine 748 such as an operating system 750, libraries 752, frameworks/middleware 754, applications 756 or presentation layer 758. These layers of software architecture executing within the virtual machine 748 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

Figure 8:
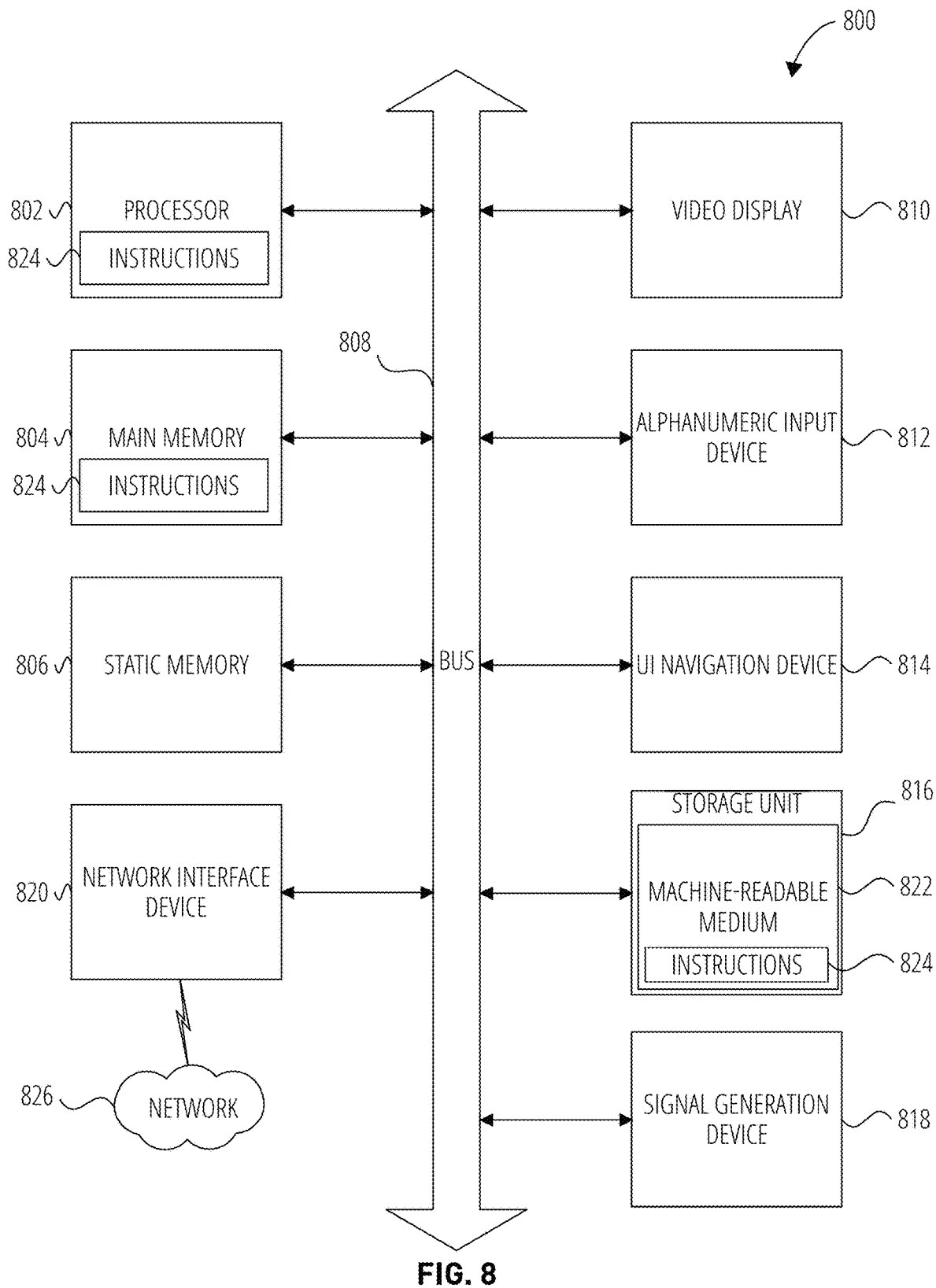
FIG. 8 is a block diagram of a machine in the form of a computer system, according to some examples, within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a GPU, or both), a primary or main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a UI navigation (or cursor control) device 814 (e.g., a mouse), a storage unit 816, a signal generation device 818 (e.g., a speaker), and a network interface device 820.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 or within the processor 802 during execution thereof by the computer system 800, with the main memory 804 and the processor 802 also each constituting a machine-readable medium 822.

While the machine-readable medium 822 is shown in accordance with some examples to be a single medium, the term "machine-readable medium" may include a single medium or multiple media (e.g., a centralized or distributed database, or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of a machine-readable medium 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 824 may further be transmitted or received over a communications network 826 using a transmission medium. The instructions 824 may be transmitted using the network interface device 820 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 824 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the subject matter may be referred to herein, individually or collectively, by the term "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. Except as otherwise indicated, the word "or" in reference to a list of two or more items, covers all of the following interpretations of the word: any one of the items in the list, all of the items in the list, and any combination of the items in the list.

Although some examples, such as those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:
  at least one memory that stores instructions; and
  one or more processors configured by the instructions to perform operations comprising:
    receiving, via a user interface, first user input identifying a root data object;
    in response to receiving the first user input:
      executing a primary query to identify, in a database, first data objects with reference relationships to the root data object, and
      recursively executing secondary queries to identify, in the database, additional data objects with reference relationships to one or more of the first data objects or to any other additional data object identified in a previous one of the secondary queries until a predetermined condition is met;
    generating an object reference structure based on the reference relationships among the root data object, the first data objects, and the additional data objects;
    causing presentation, via the user interface, of a graphical representation of the object reference structure;

receiving, via the user interface, second user input comprising a purge instruction associated with at least part of the object reference structure; and in response to receiving the second user input, triggering execution of a data purge to purge data from the database according to the purge instruction.

2. The system of claim 1, wherein the database comprises a relational database, and each data object from among the root data object, the first data objects, and the additional data objects is mapped to a table in the database.

3. The system of claim 1, wherein the graphical representation represents the object reference structure as a diagram that comprises a plurality of interconnected nodes, each of the plurality of interconnected nodes represents a respective one of the root data object, the first data objects, or the additional data objects, and the root data object is represented by a root node of the plurality of interconnected nodes in the diagram.

4. The system of claim 3, the operations further comprising:

identifying, for a data object represented in the object reference structure, one or more attributes comprising at least one of a nullability, a variant data object, an object path, a data type, or a functional component; and causing presentation, via the user interface, of the one or more attributes in association with a corresponding node of the plurality of interconnected nodes that represents the data object in the diagram.

5. The system of claim 1, wherein the object reference structure identifies child data objects and parent data objects, and wherein the predetermined condition comprises performing one or more of the secondary queries for each child data object from among the child data objects that has a corresponding parent data object, from among the parent data objects, that is not nullable within a context of the child data object.

6. The system of claim 1, the operations further comprising:

identifying a data object from among the first data objects and the additional data objects as a child data object of a parent data object from among the root data object, the first data objects, or the additional data objects;

determining a nullability of the parent data object of the child data object within a context of the child data object; and causing presentation, via the user interface, of the nullability together with the graphical representation of the object reference structure.

7. The system of claim 1, the operations further comprising:

identifying an object path of a data object from among the root data object, the first data objects, and the additional data objects; and causing presentation, via the user interface, of the object path of the data object together with the graphical representation of the object reference structure.

8. The system of claim 1, the operations further comprising:

determining a data type of a data object from among root data object, the first data objects, and the additional data objects; and causing presentation, via the user interface, of the data type together with the graphical representation of the object reference structure.

9. The system of claim 1, wherein the first user input or the second user input further comprises a value for the root data object, the operations further comprising:

using the value in addition to at least a subset of data objects from among the root data object, the first data objects, and the additional data objects to establish a purge scope associated with the purge instruction; and executing the data purge based on the purge scope.

10. The system of claim 9, wherein the root data object, the first data objects, and the additional data objects are identified in object data of a first data format, the operations further comprising:

converting at least some of the object data from the first data format to a second data format to obtain converted object data; and transmitting the converted object data in the second data format to a purging service prior to execution of the data purge.

11. The system of claim 1, the operations further comprising:

receiving, via the user interface, third user input to adjust at least one of the object reference structure or the graphical representation of the object reference structure; and adjusting a purge scope associated with the purge instruction based on the third user input.

12. The system of claim 1, wherein the purge instruction is associated with one or more temporal constraints that are used to establish a purge scope associated with the purge instruction.

13. The system of claim 1, wherein the reference relationships among the root data object, the first data objects, and the additional data objects include one or more data object dependencies and one or more nested object relationships.

14. The system of claim 1, the operations further comprising:

generating, from a database schema of the database, a list of selectable root data objects, wherein the first user input comprises a selection of the root data object from the list of selectable root data objects.

15. A method comprising:

receiving, via a user interface, first user input identifying a root data object;

in response to receiving the first user input:

receiving, via a user interface, first user input identifying a root data object;

in response to receiving the first user input:

executing a primary query to identify, in a database, first data objects with reference relationships to the root data object, and recursively executing secondary queries to identify, in the database, additional data objects with reference relationships to one or more of the first data objects or to any other additional data object identified in a previous one of the secondary queries until a predetermined condition is met;

generating an object reference structure based on the reference relationships among the root data object, the first data objects, and the additional data objects;

causing presentation, via the user interface, of a graphical representation of the object reference structure;

receiving, via the user interface, second user input comprising a purge instruction associated with at least part of the object reference structure; and in response to receiving the second user input, triggering execution of a data purge to purge data from the database according to the purge instruction.

16. The method of claim 15, wherein the database comprises a relational database, and each data object from among the root data object, the first data objects, and the additional data objects is mapped to a table in the database.

17. The method of claim 15, wherein the graphical representation represents the object reference structure as a diagram that comprises a plurality of interconnected nodes, each of the plurality of interconnected nodes represents a respective one of the root data object, the first data objects, or the additional data objects, and the root data object is represented by a root node of the plurality of interconnected nodes.

18. One or more non-transitory computer-readable media storing computer-executable instructions that, when executed by a computing system, cause the computing system to perform operations comprising:
receiving, via a user interface, first user input identifying a root data object;
in response to receiving the first user input:
executing a primary query to identify, in a database, first data objects with reference relationships to the root data object, and
recursively executing secondary queries to identify, in the database, additional data objects with reference relationships to one or more of the first data objects or to any other additional data object identified in a previous one of the secondary queries until a predetermined condition is met;
generating an object reference structure based on the reference relationships among the root data object, the first data objects, and the additional data objects;
causing presentation, via the user interface, of a graphical representation of the object reference structure;
receiving, via the user interface, second user input comprising a purge instruction associated with at least part of the object reference structure; and
in response to receiving the second user input, triggering execution of a data purge to purge data from the database according to the purge instruction.

19. The one or more non-transitory computer-readable media of claim 18, wherein the database comprises a relational database, and each data object from among the root data object, the first data objects, and the additional data objects is mapped to a table in the database.

20. The one or more non-transitory computer-readable media of claim 18, wherein the graphical representation represents the object reference structure as a diagram that comprises a plurality of interconnected nodes, each of the plurality of interconnected nodes represents a respective one of the root data object, the first data objects, or the additional data objects, and the root data object is represented by a root node of the plurality of interconnected nodes.

* * * * *